US012752450B2

(12) United States Patent
Olbrich

(10) Patent No.: US 12,752,450 B2
(45) Date of Patent: Oct. 6, 2026

(54) CUTTING TOOL HEAD

(71) Applicant: Milwaukee Electric Tool Corporation, Brookfield, WI (US)

(72) Inventor: Nathaniel Olbrich, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 159 days.

(21) Appl. No.: 17/051,397

(22) PCT Filed: Sep. 30, 2020

(86) PCT No.: PCT/US2020/053492
§ 371 (c)(1),
(2) Date: Oct. 28, 2020

(87) PCT Pub. No.: WO2021/067408
PCT Pub. Date: Apr. 8, 2021

(65) Prior Publication Data

US 2023/0144890 A1 May 11, 2023

Related U.S. Application Data

(60) Provisional application No. 62/908,288, filed on Sep. 30, 2019.

(51) Int. Cl.
*B26D 1/00* (2006.01)
*B23D 29/00* (2006.01)
(Continued)

(52) U.S. Cl.
CPC ......... *B26D 1/0006* (2013.01); *B26D 7/0006* (2013.01); *B26D 7/2614* (2013.01); (Continued)

(58) Field of Classification Search
CPC .......................... B23D 29/002; B23D 36/0008; B26D 7/2614; B26D 1/0006; B26D 7/0006; B26D 3/16; B26D 5/12
See application file for complete search history.

(56) References Cited

U.S. PATENT DOCUMENTS 1,177,303 A * 3/1916 Carski ..................... B26B 17/00 30/186
1,200,567 A * 10/1916 Yeakel ..................... B26D 1/08 30/249
(Continued)

FOREIGN PATENT DOCUMENTS

DE 10110882 B4 4/2011
EP 2446993 A1 5/2012
(Continued)

*Primary Examiner* — Jonathan G Riley
(74) *Attorney, Agent, or Firm* — Quarles & Brady LLP

(57) ABSTRACT

Embodiments of the invention provide a cutting tool. The cutting tool includes a pin that defines an axis, a first jaw, a second jaw, a first blade, and a second blade. The first and second jaws are configured to rotate about the axis. The first jaw includes a first ear surface that has a first ear bore that is dimensioned to receive the pin. The second jaw includes a second ear surface rotationally engaged with the first ear surface and includes a second ear bore that is dimensioned to receive the pin. The blades can include a tapered face and a non-tapered face. The first and second ear surfaces can be coplanar with the respective non-tapered face.

15 Claims, 10 Drawing Sheets

(51) Int. Cl.

| | |
|---|---|
| ***B23D 36/00*** | (2006.01) |
| ***B26D 3/16*** | (2006.01) |
| ***B26D 7/00*** | (2006.01) |
| ***B26D 7/26*** | (2006.01) |
| *B26D 5/12* | (2006.01) |

(52) U.S. Cl.

CPC ........ *B23D 29/002* (2013.01); *B23D 36/0008* (2013.01); *B26D 2001/002* (2013.01); *B26D 2001/0066* (2013.01); *B26D 3/16* (2013.01); *B26D 5/12* (2013.01)

(56) References Cited

U.S. PATENT DOCUMENTS

| | | | | |
|---|---|---|---|---|
| 4,283,851 | A | 8/1981 | Wolter | |
| 4,369,576 | A | 1/1983 | McVaugh | |
| 4,506,445 | A * | 3/1985 | Esten | B23D 29/002 30/92 |
| 4,802,495 | A * | 2/1989 | Maruska | A01F 11/06 460/149 |
| 6,457,338 | B1 | 10/2002 | Frenken | |
| 7,107,812 | B1 | 9/2006 | Patton et al. | |
| 7,216,523 | B2 | 5/2007 | Frenken | |
| 7,409,846 | B2 | 8/2008 | Frenken | |
| 7,434,441 | B2 | 10/2008 | Frenken | |
| 7,882,722 | B2 | 2/2011 | Lefavour et al. | |
| 7,966,734 | B2 * | 6/2011 | Crain | B26B 17/02 30/192 |
| 8,414,520 | B2 | 4/2013 | Stucki et al. | |
| 8,671,579 | B2 | 3/2014 | Frenken | |
| 8,904,848 | B2 | 12/2014 | Frenken | |
| 9,085,024 | B2 | 7/2015 | Frenken | |
| 9,314,857 | B2 | 4/2016 | Chiasson et al. | |
| 9,381,622 | B2 | 7/2016 | Wason | |
| 9,808,851 | B2 | 11/2017 | Thorson et al. | |
| 10,213,821 | B2 | 2/2019 | Thorson et al. | |
| 2015/0089816 | A1 | 4/2015 | Chiasson et al. | |
| 2016/0252112 | A1 | 9/2016 | Kehoe et al. | |
| 2016/0288193 | A1 | 10/2016 | Thorson et al. | |
| 2017/0317461 | A1 * | 11/2017 | Wason | B25B 27/10 |
| 2018/0021840 | A1 | 1/2018 | Thorson et al. | |
| 2018/0326600 | A1 | 11/2018 | Wason et al. | |
| 2019/0308255 | A1 * | 10/2019 | Wason | B26B 15/00 |
| 2020/0055130 | A1 | 2/2020 | D'Antuono et al. | |
| 2020/0070263 | A1 | 3/2020 | Olbrich | |
| 2021/0387270 | A1 | 12/2021 | Olbrich | |

FOREIGN PATENT DOCUMENTS

| | | | |
|---|---|---|---|
| EP | 3162457 | A1 | 3/2017 |
| EP | 2688164 | B1 | 6/2019 |
| EP | 3052282 | B1 | 11/2019 |
| WO | 2012/048286 | A1 | 4/2012 |

* cited by examiner

CUTTING TOOL HEAD

RELATED APPLICATIONS

The present application represents the national stage entry of International Application No. PCT/US2020/053492, filed Sep. 30, 2020, which claims priority to U.S. Provisional Application No. 62/908,288, filed Sep. 30, 2019, entitled "Cutting Tool Head," the content of which is incorporated herein by reference in its entirety.

BACKGROUND

Cutters and crimpers often include a crimping head with opposed jaws that include certain crimping and cutting features, depending on the particular configuration of the tool. Some cutters and crimpers are hydraulic power tools that include a piston that can exert force on the crimping head, which may be used for closing the jaws to perform crimp or cut at a targeted location.

SUMMARY

Embodiments of the invention provide a cutting head for a power tool. The cutting head includes a jaw coupling assembly, a first jaw, a second jaw, a first blade, and a second blade. The coupling assembly includes a hollow pin, a press ring, and a nut. The hollow pin defines an axis and has a threaded end. The first jaw is configured to rotate about the axis. The first jaw includes a first ear having a first medial ear surface and a first ear bore. The first ear bore is dimensioned to receive the hollow pin. The second jaw is configured to rotate about the axis. The second jaw includes a second hear having a second medial ear surface and a second ear bore. The second ear bore is dimensioned to receive the hollow pin. The nut is torqued and threatened onto the threaded end of the hollow pin so that the press ring is sited between the nut and the first jaw.

In some embodiments, the first blade is coupled to the first jaw and includes a first tapered face and a first non-tapered face opposite the first tapered face. The second blade is coupled to the second jaw and includes a second tapered face and a second non-tapered face opposite the second tapered face. The first non-tapered face is coplanar with the first ear surface and the second non-tapered face is coplanar with the second ear surface.

In some embodiments, the first jaw includes a first clamp and a first ear having a first ear surface. The first ear surface includes a first bore that extends therethrough and is dimensioned to receive the hollow pin. The second jaw is configured to rotate about the axis. The second jaw includes a second clamp and a second ear having a second ear surface. The second ear surface is rotationally engaged with the first ear surface and includes a second bore that extends therethrough and is dimensioned to receive the hollow pin. The first blade is mounted on the first jaw via a first blade mount bolt and the second blade is mounted on the second jaw via a second blade mount bolt. The first clamp is dimensioned to distribute the force applied from the first blade mount bolt across the first blade and the second clamp is dimensioned to distribute the force applied from the second blade mount across the second blade.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 2:
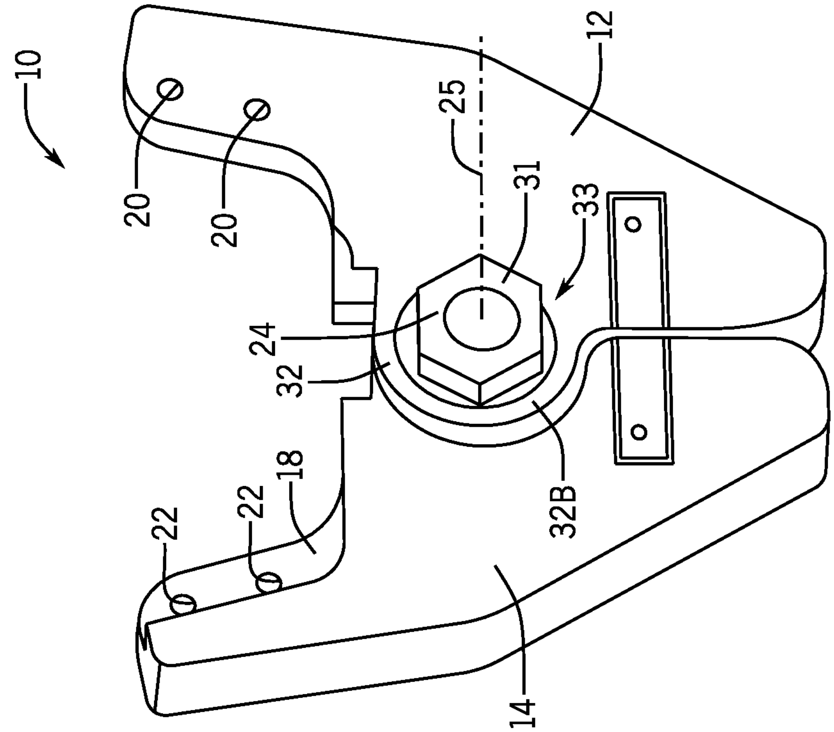
FIG. 2 is a rear isometric view of the cutting tool head of FIG. 1.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Hydraulic crimpers and cutters are types of hydraulic power tools for performing crimping and cutting work on a work piece. Hydraulic tools often include a hydraulic pump for pressurizing hydraulic fluid and transferring the fluid to a cylinder in the power tool. The cylinder includes a piston that can extend toward a cutting head of the power tool. The piston exerts a force on the cutting head, which may typically include opposed jaws with certain cutting features depending on the particular configuration of the power tool. The force exerted by the piston may be used for closing the jaws to perform cutting on a work piece, such as a wire, at a targeted cutting location.

Certain hydraulic cutting tools include a cutting tool head with jaws that pivot at a pivot point. Each of the jaws can include a cutting surface and a respective ear or extension. A portion of the cutting surface can be integral with or mounted to the ear, and a pivot pin can extend through each ear to form the pivot point. In some hydraulic cutting tools, when the jaws are in a closed position, the cutting surfaces adjacent to the ear can pass by each other. In use, the overlap of the cutting surfaces can prevent the jaws from fully cutting the work piece. For example, the jaws may jam or bind before the work piece is fully cut. In some hydraulic tools that include a cutting surface at least partially mounted to or formed with an ear, a cutting motion can cause jaws to flex or be pushed laterally away from the work piece.

A cutter is effective when the cutting tool can make a full cut on a work piece and avoid binding. Effective cutters also reduce or eliminate undesired flex and force on the jaws and blades during a cutting action. In general, a cutting tool configured to provide a full, controllable cut while limiting the force that urges jaws of the cutting tool laterally away from a work piece during a cutting action may be useful.

Figure 1:
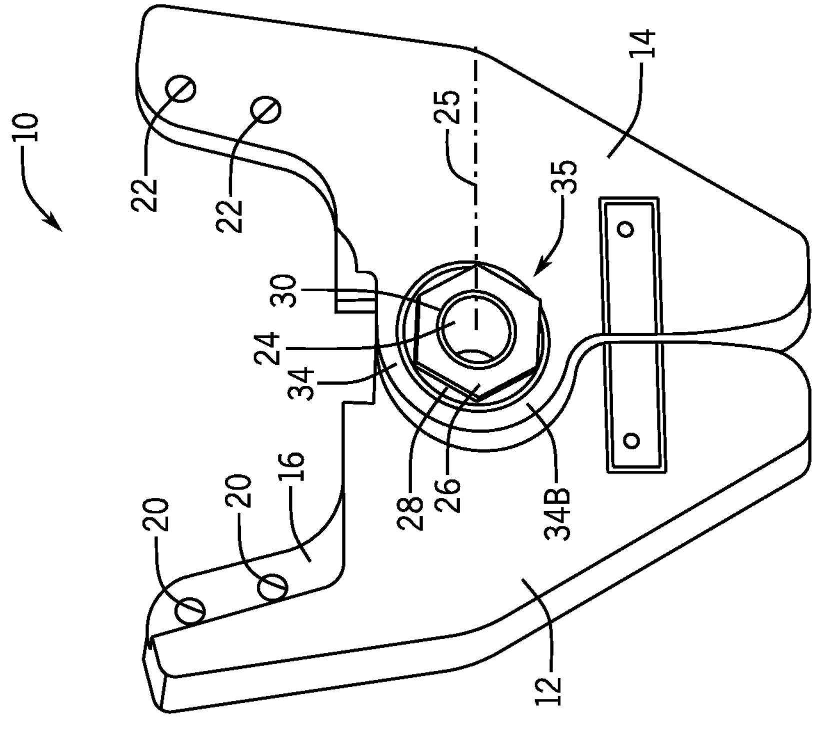
FIG. 1 is an isometric view of a cutting tool head according to one embodiment of the invention.

FIGS. 1 and 2 illustrate front and back sides of a cutting tool head 10 according to one embodiment of the invention. The cutting tool head 10 includes a first jaw 12 and a second jaw 14. In some embodiments, the cutting tool head 10 can be used with a power tool, such as a hydraulic power tool, which can include an electric motor, a pump driven by the motor, and a housing that defines a cylinder. An extendable piston can be located within the cylinder. The pump can provide pressurized hydraulic fluid to the cylinder to cause the piston to extend from the housing to actuate jaws of a cutting tool, such as the jaws 12, 14 of the cutting tool head 10.

The first jaw 12 includes a blade mounting surface 16 and the second jaw 14 includes a blade mounting surface 18. The blade mounting surfaces 16, 18 can be configured to engage a pair of blades, respectively. In some embodiments, the blade mounting surfaces 16, 18 are substantially planar. Each of the blade mounting surfaces 16, 18 include bores 20, 22, respectively. In some embodiments, the bores 20, 22 are configured as a pair of bores; however, fewer or more bores are possible.

The bores 20, 22 are dimensioned to receive blade fasteners. In some embodiments, the cutting tool head 10 can include blades that can be coupled to the blade mounting surfaces 16, 18 via blade fasteners that can extend at least partially through the bores 20, 22, respectively. In some embodiments, the blades can be removably coupled to the jaws 12, 14 so that the blades can be removed and/or replaced. In some embodiments, the bores 20, 22 can be threaded. In other embodiments, a pair of blades can be integral with respective jaws 12, 14.

The cutting tool head 10 includes a hollow pin 24, a nut 26, and a press ring 28. The hollow pin 24, which in some embodiments may be a hollow bolt or other type of pin or bolt, includes a threaded end 30 onto which the nut 26 is threaded. The hollow pin 24 defines an axis 25 about which the jaws 12, 14 can rotate. In some embodiments, the press ring 28, the hollow pin 24, and the nut 26 can be constructed of alloy materials, such as American Iron and Steel Institute (AISI) 4140 alloy steel, for example.

The first jaw 12 includes a first ear 32 and the second jaw 14 includes a second ear 34. Each ear 32, 34 includes a respective medial ear surface opposite a respective lateral ear surface 32B, 34B. Each of the medial ear surfaces and the lateral ear surface 32B, 34B can be substantially planar. When the cutting tool head 10 is assembled, the two medial ear surfaces are in contact with, and are rotationally engaged with each other.

Each ear 32, 34 has a bore 33, 35, respectively, that is dimensioned to receive the hollow pin 24. When the cutting tool head 10 is assembled, the bores 33, 35 are axially aligned and the hollow pin 24 extends through the bores 33, 35 so that a head 31 of the nut 26 is seated against the first jaw 12 at the lateral ear surface 32B. The press ring 28 can be positioned around the opposite end of the hollow pin 24 (i.e., the threaded end 30) and the nut 26 can then be threaded onto the threaded end 30 and torqued to a predetermined torque. The nut 26 holds the press ring 28 in place and the press ring 28 is seated between the nut 26 and the second jaw 14 at the lateral ear surface 34B.

In some embodiments, the predetermined torque can be selected from a range of approximately 40 inch-pounds to approximately 50 inch-pounds (approximately 4.5 Newton-meters to approximately 5.6 Newton-meters). Generally, if the torque is too high, the nut 26 can start pushing the press ring 28, and the jaw gap will not be set properly. This can cause the jaws 12, 14 to be pushed too close together, and the jaws 12, 14 will bind up and not cut properly.

The press ring 28 can reduce the tolerance required between the jaws 12, 14, and therefore, between their respective blades. In general, a smaller the gap between the jaws 12, 14 can correspond to a better quality of cut and increase the angle between the jaws 12, 14 to make cuts without jamming.

Figure 3:
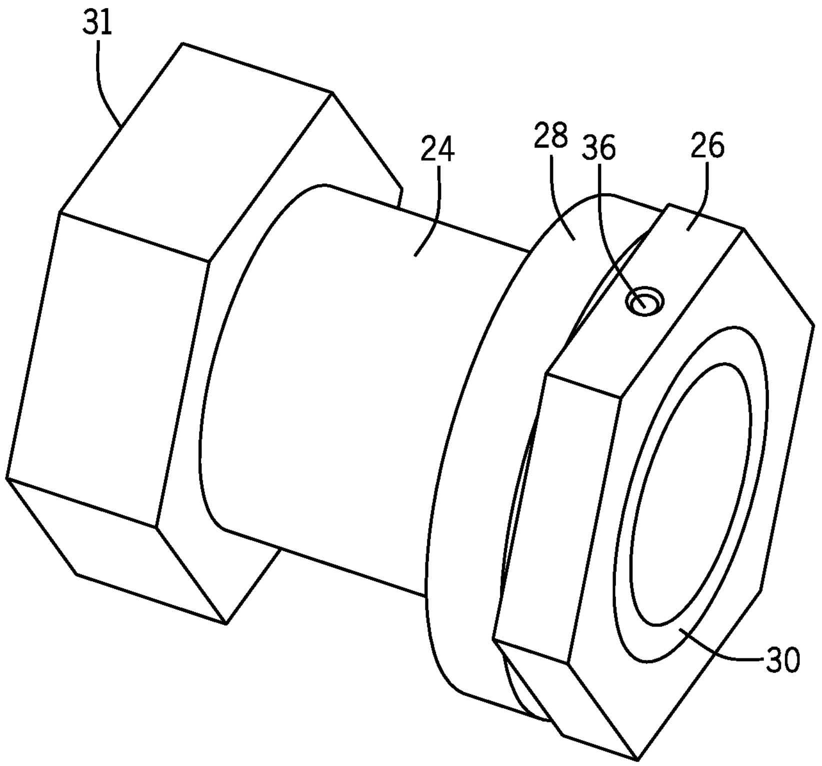
FIG. 3 is an isometric view of a pin assembly of the cutting tool head of FIG. 1.

FIG. 3 illustrates the hollow pin 24, the nut 26, and the press ring 28 according to one embodiment of the invention. The nut 26 includes a bore 36 dimensioned to receive a fastener, such as a set screw, for example. The fastener can secure the nut 26 in place at the threaded end 30 and can prevent the nut 26 from becoming loose. The nut 26 facilitates securing the jaws 12, 14 together and can help prevent the nut 26 or press ring 28 from loosening during cutting actions.

Figure 5:
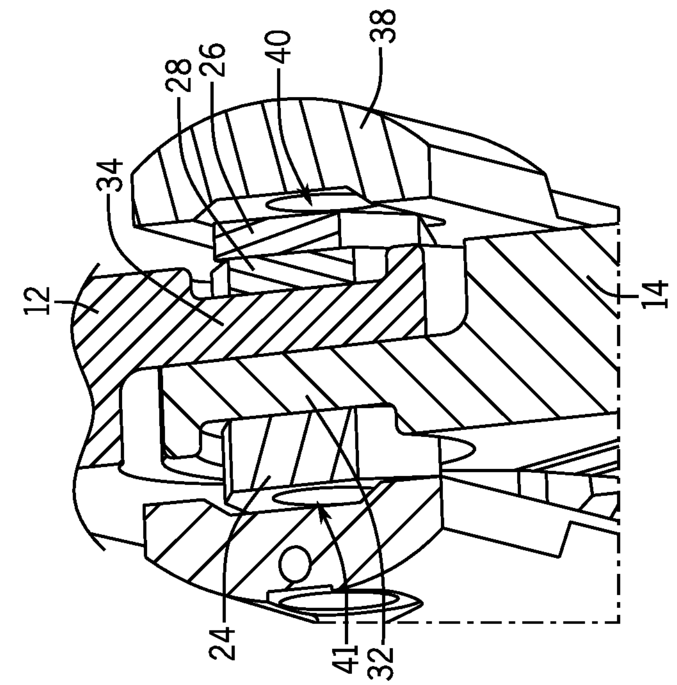
FIG. 5 is an isometric cross-sectional top view of the clevis and the cutting tool head of FIG. 4.
Figure 4:
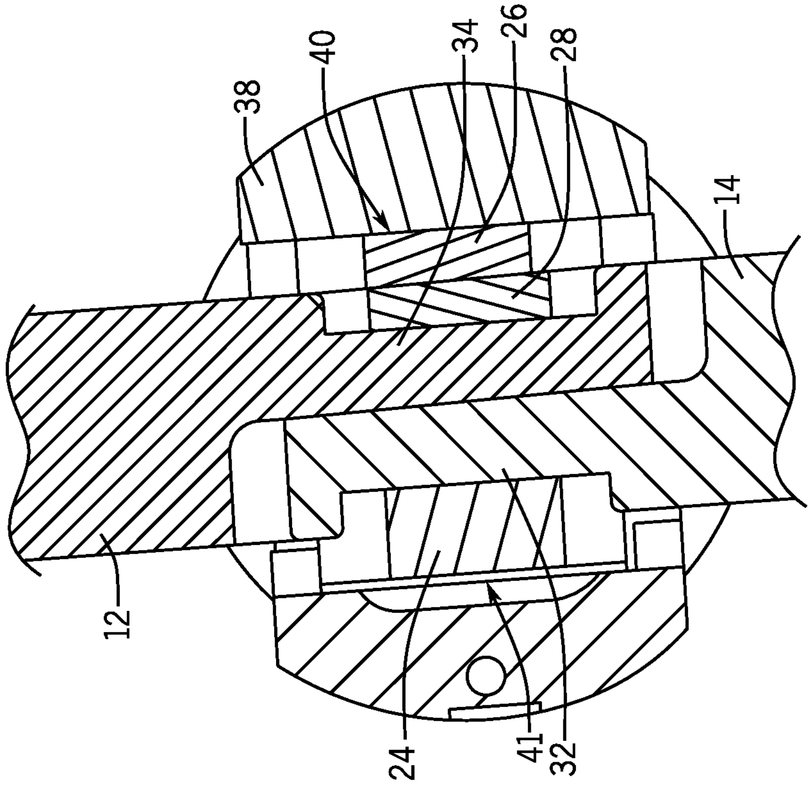
FIG. 4 is cross-sectional top view of a clevis and the cutting tool head of FIG. 1.

FIGS. 4 and 5 illustrate a cross section of the cutting tool head 10 and a clevis 38. In some embodiments, the clevis 38 can secure the cutting tool head 10 to a portion of a power tool. In some embodiments, the hollow pin 24, as well as the clevis 38, can receive a clevis pin (not shown) for attaching the cutting tool head 10 to the clevis 38. A first gap 40 is formed between the nut 26 and the clevis 38 and a second gap 41 between the head of the hollow pin 24 and the clevis 38. The press ring 28 thickness can be selected to control a gap between the first ear 32 and the second ear 34.

Figure 6:
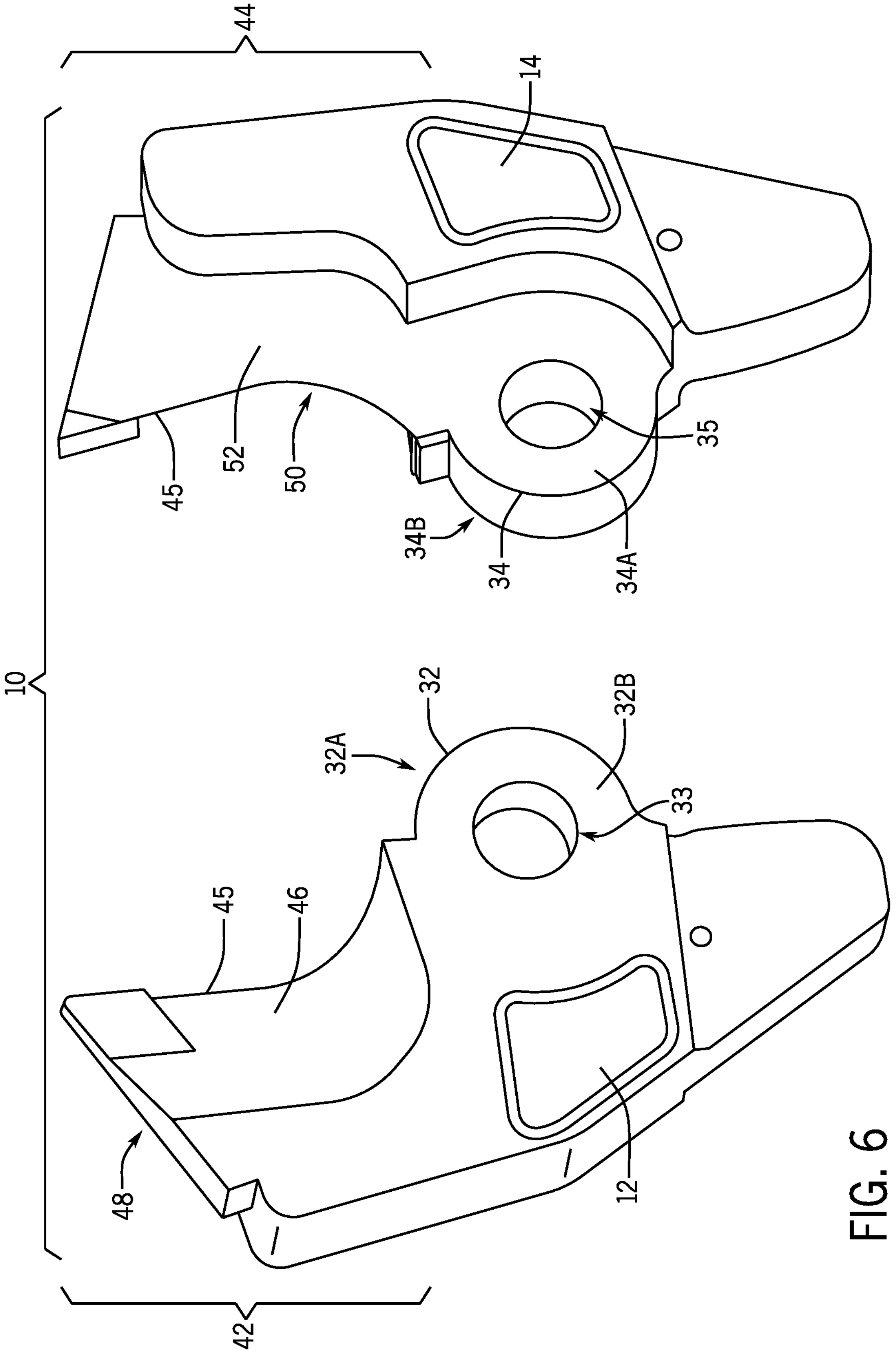
FIG. 6 is an exploded isometric view of a cutting tool head according to another embodiment of the invention.

FIG. 6 illustrates the cutting tool head 10 according to another embodiment of the invention. The cutting tool head 10 includes a first blade 42 integrally formed with the first jaw 12 and a second blade 44 integrally formed with the second jaw 14. In some embodiments, the integrally formed blades 42, 44 can increase the stiffness of the blades 42, 44, allow the jaws 12, 14 to be held tighter together, and reduce flexing of the cutting tool head 10. The first blade 42 includes a tapered face 46 and a non-tapered face 48. The second blade 44 includes a tapered face 50 and a non-tapered face 52.

Each tapered face 46, 50 is adjacent to the respective lateral ear surface 32B, 34B. Each medial ear surface 32A, 34A is substantially coplanar with the non-tapered face 48, 52 respectively. When the cutting tool head 10 is assembled and the jaws 12, 14 are brought together, the first medial ear surface 32A and the second medial ear surface 34A mate substantially flat against each other and the first non-tapered face 48 and the second non-tapered face 52 are substantially coplanar. The co-planarity can increase the stiffness and tightness at which the jaws 12, 14 are held together, and can decrease a nominal clearance between the jaws 12, 14. Decreasing the nominal clearance, and therefore, a nominal gap between the jaws 12, 14, can counteract the force that urges the jaws 12, 14 apart during a cutting action.

In some embodiments, the jaws 12, 14 and or blades 42, 44 can include AISI 4140 alloy steel, AISI 4340 alloy steel, and/or carbide. The blades 42, 44 can taper from a nominal maximum thickness that is approximately between 7 millimeters and 13 millimeters. The blades 42, 44 can taper down to a sharp blade edge 45 having a thickness between approximately 0.2 millimeters and 0.6 millimeters. During a manufacturing process of the cutting tool head 10, the integral blades 42, 44 can be computer numerical control (CNC) machined with precise tolerances to achieve co-planarity.

Figure 7:
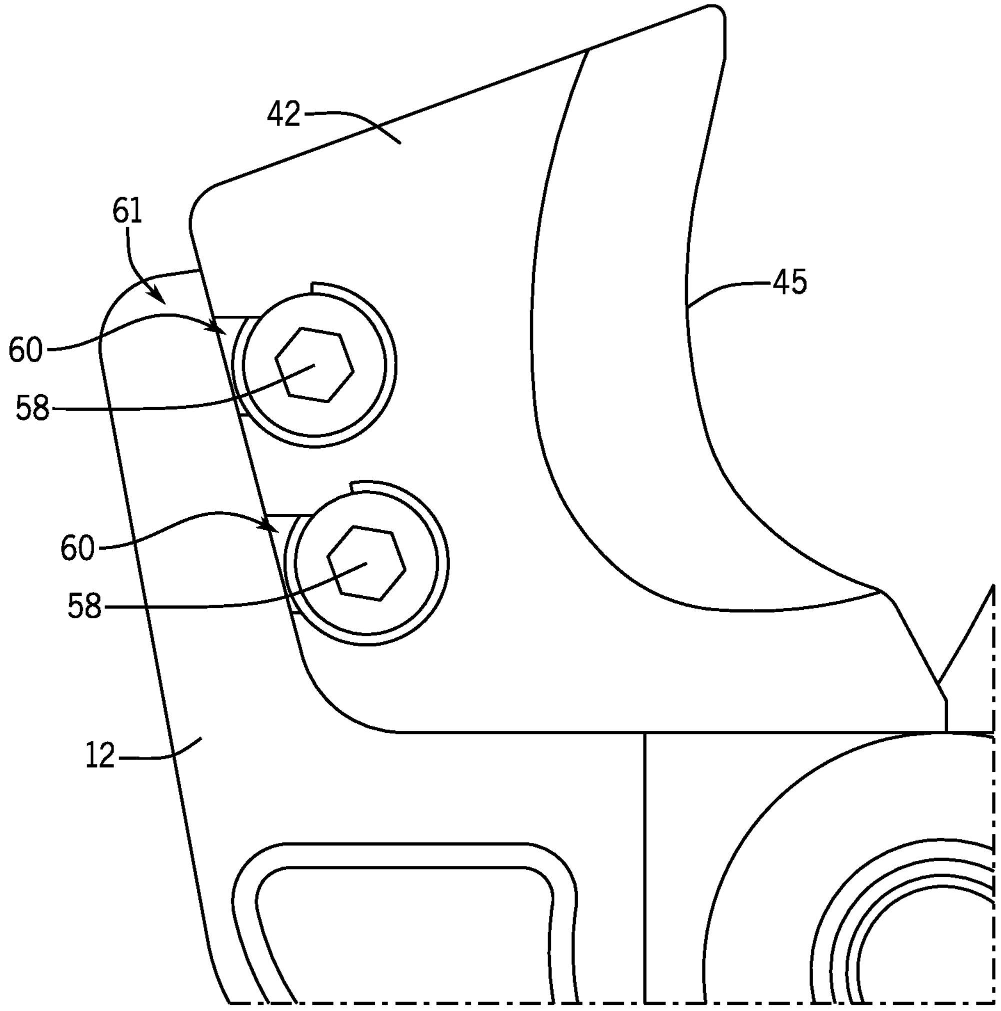
FIG. 7 is a side view of a jaw of a cutting head according to another embodiment of the invention.

FIG. 7 illustrates the first jaw 12 of the cutting tool head 10 according to another embodiment of the invention. The first blade 42 is distinct from the first jaw 12. The blade 42 is mounted to the first jaw via fasteners, configured as blade mount bolts 58 in the illustrated embodiment. To facilitate mounting of the first blade 42 to the first jaw 12, the first blade 42 can include a pair of notches 60 on an end 61 of the blade opposite the blade edge 45 of the first blade 42. To mount the first blade 42, the pair of blade mount bolts 58 are inserted through the pair of notches 60 in the first jaw 12, through the first pair of blade mount bores 20 (see FIG. 1), and then tightened to secure the first blade 42 into place. The second blade 44 can be mounted to the second jaw 14 in a similar manner. In some embodiments, the notches 60 can be configured as bores.

Figure 9:
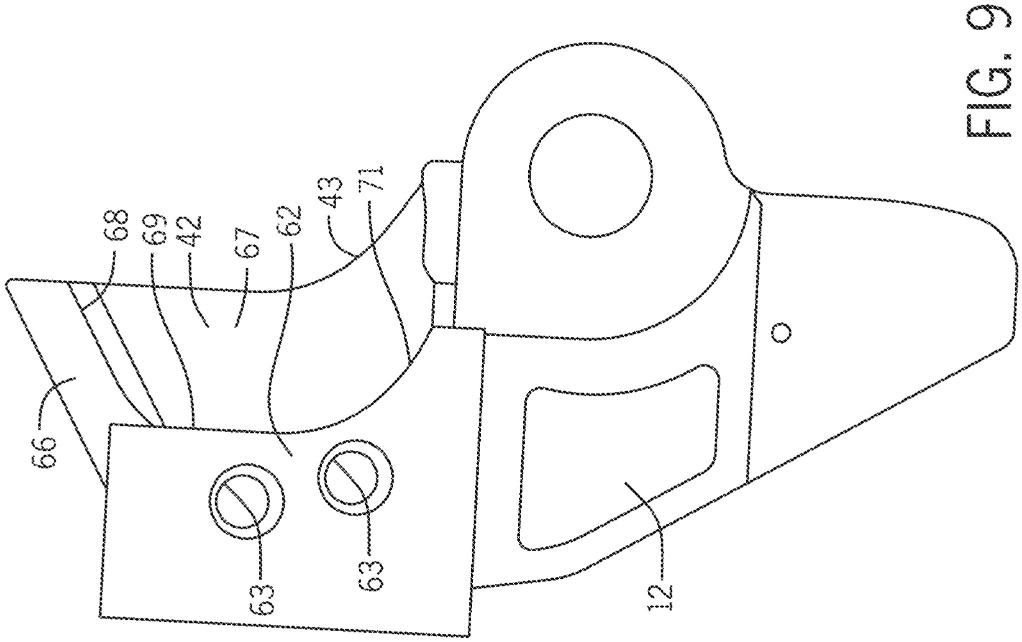
FIG. 9 is a side view of the jaw of the cutting tool head of FIG. 8.
Figure 8:
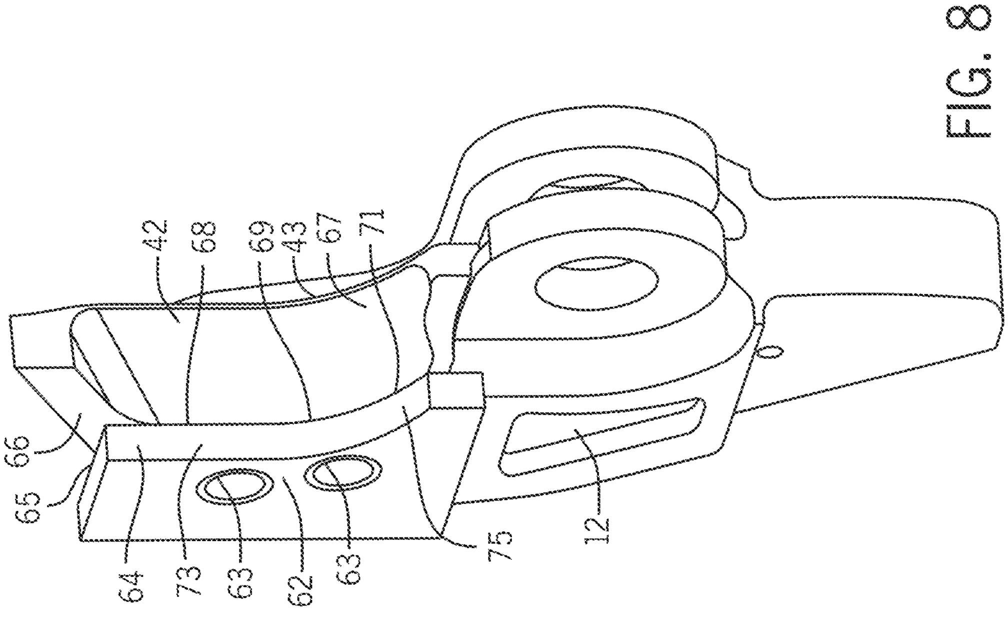
FIG. 8 is an isometric view of a jaw of a cutting tool head according to another embodiment of the invention.
Figure 11:
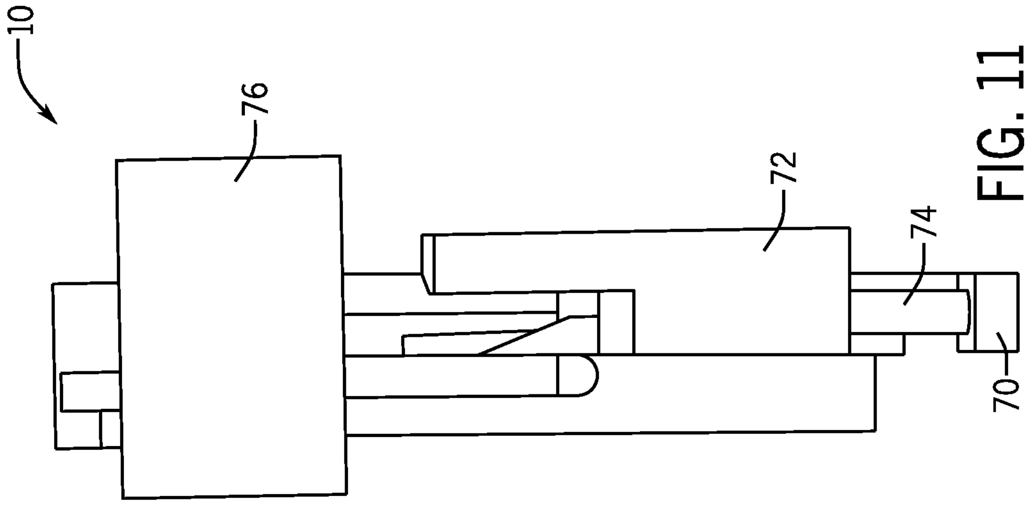
FIG. 11 is a side view of the cutting tool head of FIG. 10.

FIGS. 8 and 9 illustrate the first jaw 12 of the cutting tool head 10 according to another embodiment of the invention. The first blade 42 is distinct from the first jaw 12 and is mounted to the first jaw 12 via blade mount bolts 58 (see FIG. 7) and a clamp plate 62. The clamp plate 62 is a piece of metal with a pair of bores 63 for the pair of blade mount bolts 58 to pass through. The clamp plate 62 has a first face 64 and a second face 65 positioned perpendicular to the first face 64, as shown in FIG. 8. The clamp plate 62 can provide an even pressure securing surface which provides similar benefits as a washer.

When assembled, blade mount bolts 58 can extend through notches 60, through blade mount bores 20, and through bores 63 in the clamp plate 62. The blade mount bolts 58 can be tightened to secure the blade 42 into place. The clamp plate 62 is positioned between first blade 42 and heads of the blade mount bolts 58. A similar mounting configuration can apply to the second blade 44.

The clamp plate 62 can advantageously distribute the force from the pair of blade mount bolts 58 across a larger area (e.g., the entire surface) of the first blade 42, thereby reducing the amount of flex of the first blade 42 during cutting actions. To facilitate this, the clamp plate 62 can be designed to substantially match, or be similar to, the shape of a flat portion 66 of the top of the first blade 42 and stop before the first blade 42 begins to taper (e.g., before a tapered region 67 of the first blade 42) so that the clamp plate 62 does not affect the cutting of a work piece during a cutting action.

For example, as shown in FIGS. 8 and 9, the first blade 42 includes the flat portion 66 and the tapered region 67 (e.g., a taper) that defines a cutting edge 43 of the first blade 42. A first edge 68 defines a boundary where the flat portion 66 adjoins the tapered region 67. The first edge 68 defines a linear portion 69 and a curved portion 71. In other examples, the first edge 68 can be shaped differently, for example, to include only a curved portion, as shown in FIG. 7. The first clamp plate 62 is coupled to the first blade 42, and more specifically, to the flat portion 66 of the first blade 42. The first clamp plate 62 includes the first face 64 that is contoured to follow and extend along at least a portion of the first edge 68. For example, as shown in FIGS. 8 and 9, the first face 64 includes a linear region 73 and a curved region 75 that follow and extend along the linear portion 69 and the curved portion 71 of the first edge 68, respectively. More specifically, the linear region 73 extends parallel to the linear portion 69 of the first edge 68 and the curved region 75 extends parallel to the curved portion 71. The curved region 75 and the linear region 73 form a smooth, continuous surface of the first face 64. The first face 64 is perpendicular to the flat portion 66 of the first blade.

As similarly mentioned above, the clamp plate 62, and more specifically the first face 64, is designed to substantially match, or be similar to, the shape of the flat portion 66 of the first blade 42. Accordingly, the first clamp plate 62 does not extend over the tapered region 67 so that the clamp plate 62 does not affect the cutting of a work piece during a cutting action. For example, as shown in FIGS. 8 and 9, the clamp plate 62 is positioned so that the first face 64 abuts the first edge 68.

FIGS. 10-14 illustrate the cutting tool head 10 according to another embodiment of the invention. The cutting tool head 10 can include a guide mount 70, a blade guide 72, a spring mount 74, and a U-shaped retainer 76. In the illustrated embodiment, the blades 42, 44 are shown as separate components from the jaws 12, 14; however, in some embodiments, the blades 42, 44 are integral with their respective jaws 12, 14. The blade guide 72 and/or the U-shaped retainer 76 can be made of AISI 4140 steel or AISI 4340 steel.

Figure 10:
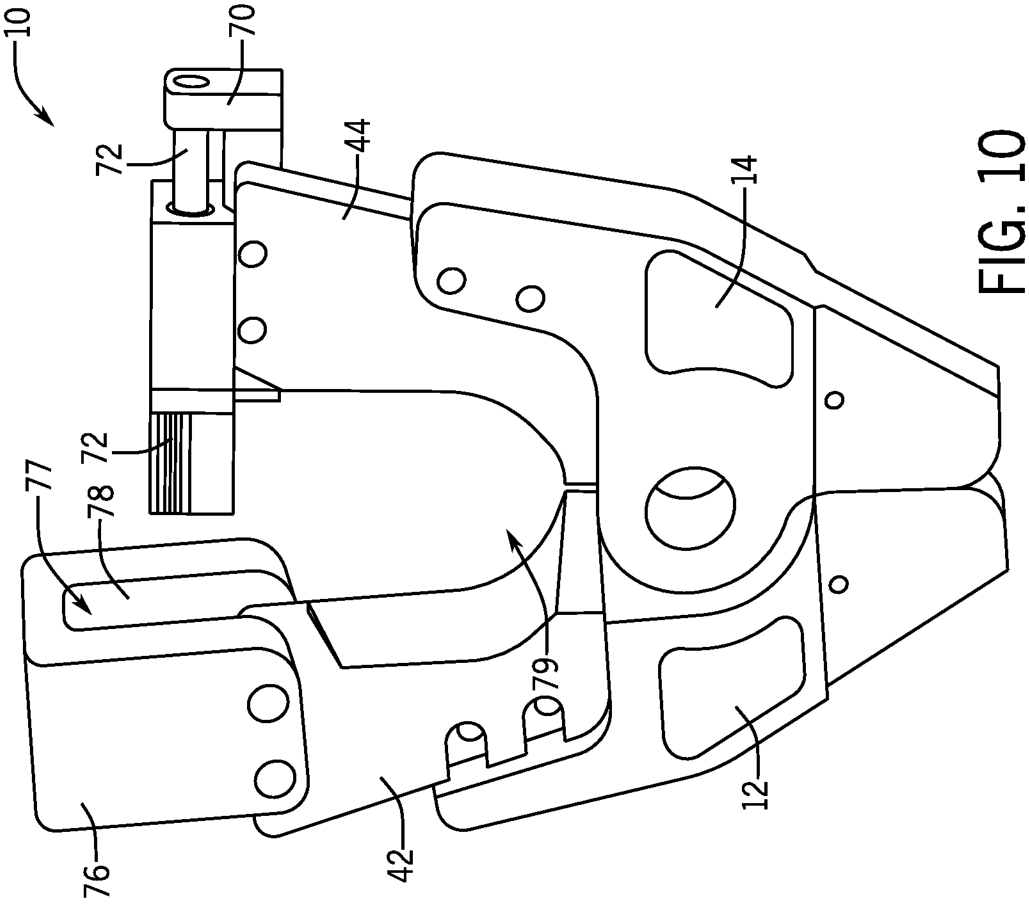
FIG. 10 is an isometric view of a cutting tool head including a blade guide in an extended position according to another embodiment of the invention.

Illustrated in FIG. 10, the U-shaped retainer 76 is coupled to the first blade 42. In some embodiments, the U-shaped retainer 76 can be integral with the first blade 42. The U-shaped retainer 76 can be coupled so that it is movable relative to the first blade 42. In other embodiments, the U-shaped retainer 76 can be coupled so that it is not movable relative to the first blade 42. The U-shaped retainer 76 defines a space 77 into which the blade guide 72 can be received.

The blade guide mount 70 is coupled to the second blade 44. The blade guide mount 70 includes the spring mount 74, by which the blade guide 72 is operably connected to the blade guide mount 70. The blade guide 72 can include a hole for receiving a spring (not shown). One end of the spring can be connected to the spring mount 74 and the opposite end of the spring can be connected to the blade guide 72. The spring biases the blade guide 72 toward a transversely extended position where the blade guide 72 protrudes, in a direction toward the U-shaped retainer 76, into a space 79 between the first blade and the second blade (e.g., an area where a work piece can be disposed when the cutting tool head 10 is used to cut the work piece). The blade guide 72 is movable in a direction that is substantially parallel to the plane on which the jaws 12, 14 transversely move between their open and closed positions.

Figure 13:
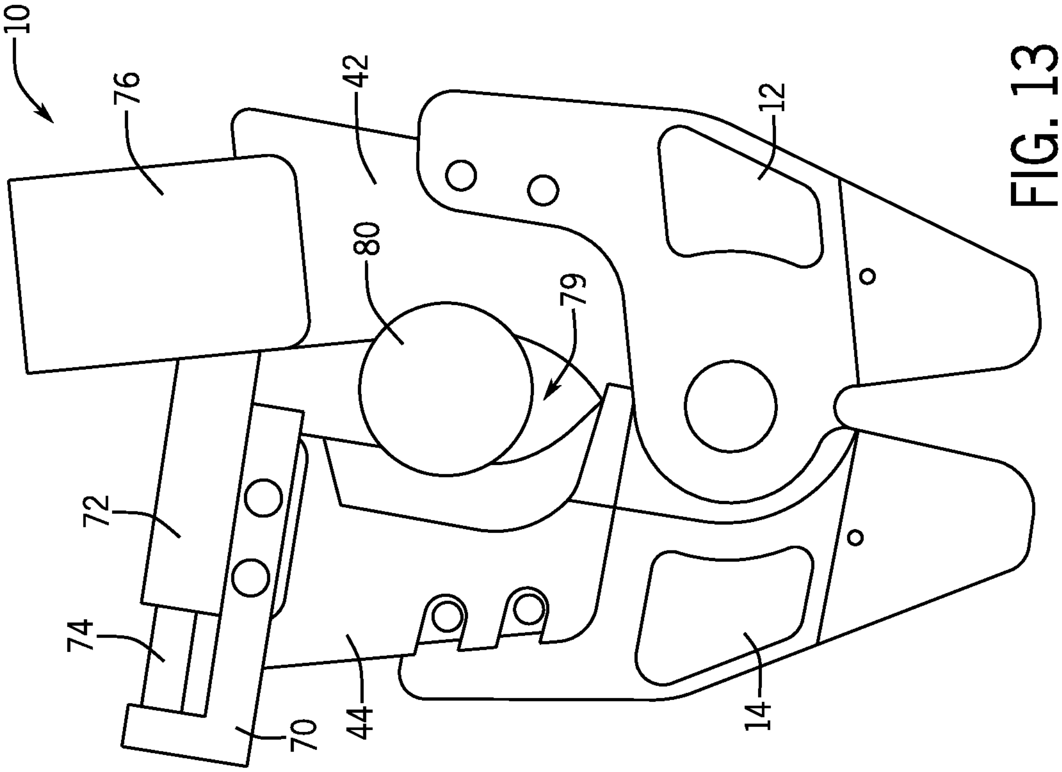
FIG. 13 is a front view of the cutting tool head of FIG. 10 and a work piece inserted between jaws of the cutting tool head.
Figure 12:
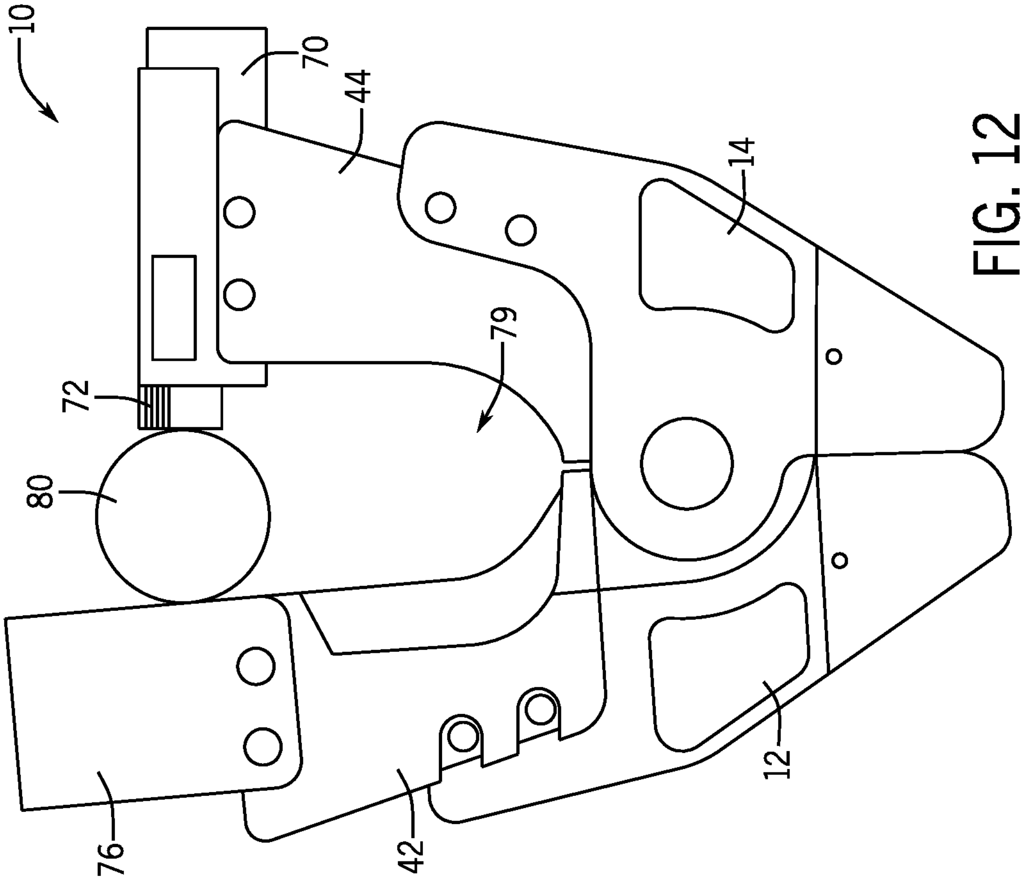
FIG. 12 is a front view of the cutting tool head of FIG. 10 including the blade guide in a retracted position.
Figure 14:
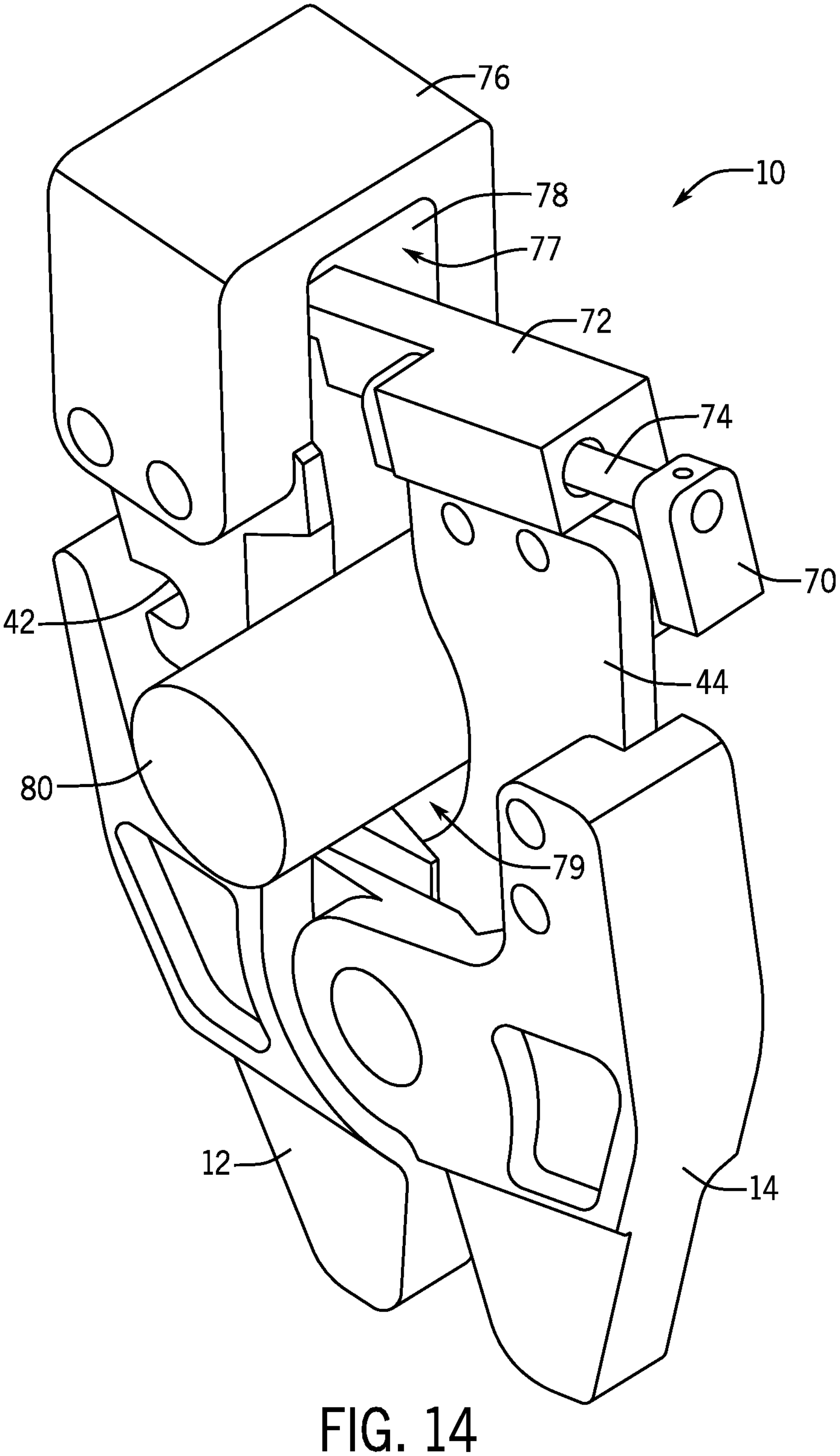
FIG. 14 is an isometric view of the cutting tool head of FIG. 13.

In use, when a work piece, such as a cable, for example, is inserted in the space 79 between the jaws 12, 14, the work piece pushes the blade guide 72 to a retracted position, as shown in FIG. 12. The blade guide 72 can then move back to the extended position, as shown in FIG. 13, due to being spring-biased. When the jaws 12, 14 and the blades 42, 44 are then brought together to cut the work piece during the cutting action, the blade guide 72 enters the space 77 defined by the U-shaped retainer 76 and can contact an inside surface 78 of the U-shaped retainer, as shown in FIG. 14. The engagement of the U-shaped retainer 76 with the blade guide 72 can prevent the blades 42, 44 from moving off axis or away from each other during the cutting motion, particularly during high-force cutting actions. The blade guide 72 can also limit or prevent slippage by the blades 42, 44 during cutting actions to ensure a work piece is fully cut by the cutting tool head 10.

Figure 15:
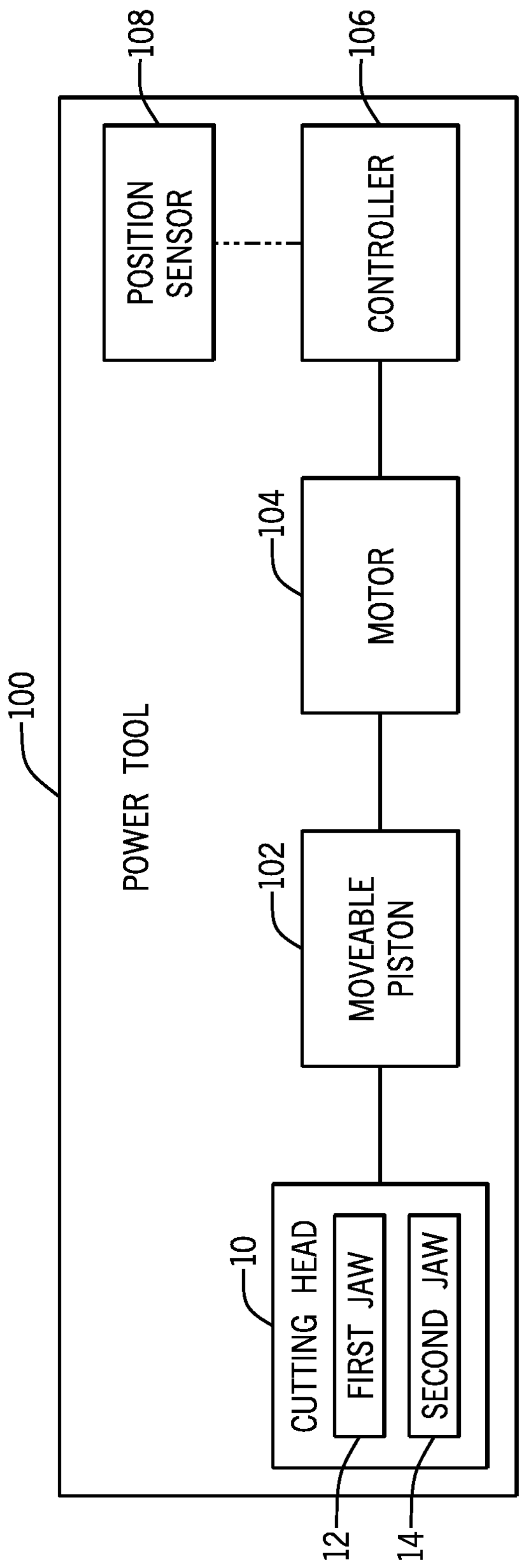
FIG. 15 is a block diagram representing components of a hydraulic tool according to some embodiments of the invention.

FIG. 15 illustrates a block diagram of an example of a power tool 100 that can include the embodiments of the cutting tool head 10. The power tool 100 includes a moveable piston 102 coupled to the cutting tool head 10, a motor 104 operable to drive the moveable piston 102 to open and close the jaws 12, 14, and a controller 106 configured to operate the motor 104.

In some embodiments, the power tool 100 can include a position sensor 108 for indicating to the controller 106 that the jaws 12, 14 are in the open or closed position, so that the controller 106 can determine when the jaws 12, 14 are in the open position and when the jaws 12, 14 are in the closed position, and determine when to start or stop operation of the motor 104. Once the controller 106 determines that the jaws 12, 14 are in the closed position, for example, the controller 106 can stop operation of the motor 104.

By the term "substantially" or "about" used herein, it is meant that the recited characteristic, parameter, value, or geometric planarity need not be achieved exactly, but that deviations or variations, including for example, tolerances, measurement error, measurement accuracy limitations and other factors known in the art, may occur in amounts that do not preclude the effect the characteristic was intended to provide.

The description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A cutting tool head for a power tool, the cutting tool head comprising:

a hollow pin defining an axis;

a first jaw configured to rotate about the axis, the first jaw including a first clamp having a first face and a second face, and a first ear having a first ear surface, the first ear surface having a first bore extending therethrough;

a second jaw configured to rotate about the axis, the second jaw including a second clamp having a third face and a fourth face, and a second ear having a second ear surface, the second ear surface rotationally engaged with the first ear surface and having a second bore extending therethrough;

a first blade having a first flat portion and a first taper, the first blade mounted on the first jaw via a first blade mount bolt; and a second blade having a second flat portion and a second taper, the second blade mounted on the second jaw via a second blade mount bolt, the first face of the first clamp contoured to follow and extend along a first edge defined between the first flat portion and the first taper of the first blade, the first edge including a first linear portion and a first curved portion, and the third face of the second clamp contoured to follow and extend along a second edge defined between the second flat portion and the second taper of the second blade, the second edge having a second linear portion and a second curved portion.

2. The cutting tool head of claim 1, further comprising:

a first blade mounting surface having a first pair of bores; and a second blade mounting surface having a second pair of bores.

3. The cutting tool head of claim 2, wherein the first blade includes a first pair of notches, each notch of the first pair of notches dimensioned to receive the first blade mount bolt to secure the first blade to the first blade mounting surface and the second blade includes a second pair of notches, each notch of the second pair of notches dimensioned to receive the second blade mount bolt to secure the second blade to the second blade mounting surface.

4. The cutting tool head of claim 1, wherein the first jaw and the second jaw are configured to move transversely between an open position and a closed position, and wherein the first clamp stops before the taper of the first blade so that the first clamp does not overlap the taper of the first blade and the second clamp stops before the taper of the second blade so that the second clamp does not overlap the taper of the second blade.

5. The cutting tool head of claim 1, further comprising:

a blade guide coupled to a blade guide mount, the blade guide being biased toward a transversely extended position between the first blade and the second blade.

6. The cutting tool head of claim 5, further comprising:

a U-shaped retainer coupled to the first blade and dimensioned to receive the blade guide during a cutting action, the blade guide engaging an interior wall of the U-shaped retainer during the cutting action.

7. The cutting tool head of claim 1, wherein the first bore of the first ear surface and the second bore of the second ear surface receive the hollow pin.

8. The cutting tool head of claim 7, wherein the first clamp is positioned adjacent to a first lateral ear surface of the first ear surface and the second clamp is positioned adjacent to a second lateral ear surface of the second ear surface, and wherein a head of a nut that is threadably secured to the hollow pin is seated against the first lateral ear surface, and wherein the first clamp is located closer to the head of the nut than the second clamp.

9. The cutting tool head of claim 1, wherein the first face of the first clamp is perpendicular to the second face of the first clamp, and wherein the third face of the second clamp is perpendicular to the fourth face of the second clamp.

10. A cutting tool head for a power tool, the cutting tool head comprising:

a first jaw including a first ear having a first ear surface;

a second jaw including a second ear having a second ear surface, the second ear surface rotationally engaged with the first ear surface;

a first blade coupled to the first jaw and defining a first edge where a first flat portion adjoins a first taper that defines a first cutting edge;

a second blade coupled to the second jaw and defining a second edge where a second flat portion adjoins a second taper that defines a second cutting edge;

a first clamp coupled to the first flat portion and including a first clamp face that extends parallel to the first edge; and a second clamp coupled to the second flat portion and including a second clamp face that extends parallel to the second edge.

11. The cutting tool head of claim 10, further comprising:

a hollow pin defining an axis;

a first bore extending through the first ear surface that receives the hollow pin; and a second bore extending through the second ear surface that receives the hollow pin.

12. The cutting tool head of claim 10, wherein the first blade is coupled to the first jaw via a first blade mount bolt, and the second blade is coupled the second jaw via a second blade bolt.

13. The cutting tool head of claim 10, wherein at least one of the first clamp face and the second clamp face includes a curved region.

14. The cutting tool head of claim 10, wherein at least one of the first clamp face is perpendicular to the first flat portion and the second clamp face is perpendicular to the second flat portion.

15. The cutting tool head of claim 10, wherein the first clamp face is positioned to abut the first edge and the second clamp face is positioned to abut the second edge.

* * * * *